United States Patent
Yano et al.

(10) Patent No.: US 10,164,820 B2
(45) Date of Patent: Dec. 25, 2018

(54) METHOD AND DEVICE FOR DETECTING RADIO COMMUNICATION ANOMALIES

(71) Applicant: FUJITSU LIMITED, Kawasaki-shi, Kanagawa (JP)

(72) Inventors: Ai Yano, Kawasaki (JP); Jun Kakuta, Yokohama (JP); Nami Nagata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 15/393,845

(22) Filed: Dec. 29, 2016

(65) Prior Publication Data
US 2017/0201412 A1 Jul. 13, 2017

(30) Foreign Application Priority Data
Jan. 8, 2016 (JP) .................................. 2016-002962

(51) Int. Cl.
*H04B 17/26* (2015.01)
*H04L 12/24* (2006.01)
(Continued)

(52) U.S. Cl.
CPC ........... *H04L 41/064* (2013.01); *H04B 17/26* (2015.01); *H04B 17/318* (2015.01);
(Continued)

(58) Field of Classification Search
None
See application file for complete search history.

(56) References Cited

U.S. PATENT DOCUMENTS

2008/0104460 A1* 5/2008 Kanaoka .......... G11B 20/10009
714/721
2008/0263073 A1 10/2008 Ohba et al.
(Continued)

FOREIGN PATENT DOCUMENTS

| CN | 204166557 | 2/2015 |
|---|---|---|
| GB | 2326063 | 12/1998 |

(Continued)

OTHER PUBLICATIONS

Extended European Search Report dated May 10, 2017 in corresponding European Patent Application No. 16201332.0.

*Primary Examiner* — Yaotang Wang
(74) *Attorney, Agent, or Firm* — Staas & Halsey LLP

(57) ABSTRACT

A radio communication anomaly detecting method includes: gathering and storing different kinds of parameters indicating a radio quality with a sensor node in a storage unit; classifying parameter sets, each containing specific kinds of parameters gathered during a prescribed time period among the stored parameters, into clusters; estimating that a rapid radio quality degradation has occurred during the prescribed time period when there is a cluster of which all average values of specified kinds of parameters among the different kinds of parameters degrade more than those of another cluster; and performing a trend analysis for a time period during which it is not estimated that the rapid radio quality degradation has occurred to determine whether each of the different kinds of parameters gathered during the time period exhibits a trend of degradation, and estimating that a slow radio quality degradation has occurred based on a result of the trend analysis.

18 Claims, 10 Drawing Sheets

(51) Int. Cl.
*H04L 12/26* (2006.01)
*H04W 28/02* (2009.01)
*H04B 17/318* (2015.01)
*H04W 84/18* (2009.01)

(52) U.S. Cl.
CPC .......... *H04L 41/0645* (2013.01); *H04L 43/18* (2013.01); *H04W 28/0242* (2013.01); *H04W 84/18* (2013.01)

(56) References Cited

U.S. PATENT DOCUMENTS

| | | | |
|---|---|---|---|
| 2011/0185235 A1 | 7/2011 | Iizuka | |
| 2014/0052841 A1 | 2/2014 | Kanemasa et al. | |
| 2014/0058763 A1* | 2/2014 | Zizzamia | G06Q 40/08 705/4 |
| 2014/0105262 A1* | 4/2014 | Alloin | H04B 3/46 375/222 |

FOREIGN PATENT DOCUMENTS

| | | |
|---|---|---|
| JP | 2008-278148 | 11/2008 |
| JP | 2014-38578 | 2/2014 |
| JP | 2014-149840 | 8/2014 |
| JP | 2016-33778 | 3/2016 |

* cited by examiner

FIG. 4

<RADIO STATUS DB 32>

| PARAMETER SET ORDER | RADIO FIELD INTENSITY(RSSI) [dBm] | LINK QUALITY (LQ) | RESPONSE TIME [ms] |
|---|---|---|---|
| 1 | −62 | 213 | 51.258 |
| 2 | −57 | 211 | 41.172 |
| 3 | −57 | 213 | 46.784 |
| ⋮ | ⋮ | ⋮ | ⋮ |

FIG. 7A

| DATA SET SEQUENCE CLUSTER ID | B B B B B B B B B B B B B B B B A A B A B<br>B B B A A A A A A A A B B B B B B B B B B<br>A A A A A A A B A A A B A B B |
|---|---|

FIG. 7B

| | CLUSTER ID | RADIO FIELD INTENSITY (RSSI) [dBm] | LINK QUALITY (LQ) | RESPONSE TIME [ms] |
|---|---|---|---|---|
| AVERAGE VALUE | A | −57.67 | 214.6 | 90.216 |
| | B | −58.65 | 231.35 | 48.098 |
| | | B IS WORSE THAN A | A IS WORSE THAN B | A IS WORSE THAN B |

FIG. 7C

| | RADIO FIELD INTENSITY (RSSI) [dBm] | LINK QUALITY (LQ) | RESPONSE TIME [ms] |
|---|---|---|---|
| SIGNIFICANT DIFFERENCE (P-VALUE) | 0.4024 | 0.0000 | 0.0001 |
| | HAVE NO SIGNIFICANT DIFFERENCE | HAVE SIGNIFICANT DIFFERENCE | HAVE SIGNIFICANT DIFFERENCE |

METHOD AND DEVICE FOR DETECTING RADIO COMMUNICATION ANOMALIES

CROSS-REFERENCE TO RELATED APPLICATION

This application is based upon and claims the benefit of priority of the prior Japanese Patent Application No. 2016-002962, filed on Jan. 8, 2016, the entire contents of which are incorporated herein by reference.

FIELD

A certain aspect of embodiments described herein relates to a method for detecting radio communication anomalies, a non-transitory computer readable medium, and a device for detecting radio communication anomalies.

BACKGROUND

There have been conventionally developed and operated systems that include sensor nodes placed in a wide area and make a processing device capable of communicating with the sensor nodes via radio waves obtain and analyze values measured by the sensor nodes. For example, the processing device that has received measured values of sewer water levels or gas concentrations transmitted from the sensors located on the back sides of manhole covers performs diagnosis with the measured values to detect the state inside the manhole.

When radio communication is used for communication between the sensor node and the processing device, communication failure such as shielding by vehicles or interference from peripheries may occur, preventing the processing device from obtaining measured values. Thus, technologies for detecting anomalies of radio communication with a high degree of accuracy are important.

A method that detects anomalies by comparison with a cluster generated from observation data at normal time has been known as the technology for detecting anomalies of radio communication as disclosed in, for example, Japanese Patent Application Publication No. 2016-33778 (Patent Document 1). The art of Patent Document 1 is an anomaly diagnosis and preventive maintenance system for mechanical equipment, generates a cluster of each period of time with normal time-series data based on an operation schedule, and performs the comparison with the cluster to detect an anomaly.

SUMMARY

According to an aspect of the present invention, there is provided a device for detecting radio communication anomalies, the device being capable of communicating with a sensor node via radio waves, the device including: a memory; and a processor coupled to the memory and configured to: gather and store different kinds of parameters in a storage unit, the different kinds of parameters indicating a quality of radio communication with the sensor node; classify parameter sets into a plurality of clusters, each of the parameter sets containing specific kinds of parameters gathered during a prescribed time period among the parameters stored in the storage unit; estimate that a rapid radio quality degradation has occurred during the prescribed time period when there is a cluster of which all average values of specified kinds of parameters among the different kinds of parameters degrade more than those of another cluster; perform a trend analysis for a time period during which it is not estimated that the rapid radio quality degradation has occurred to determine whether each of the different kinds of parameters gathered during the time period exhibits a trend of degradation; and estimate that a slow radio quality degradation has occurred based on a result of the trend analysis by the trend analyzer.

BRIEF DESCRIPTION OF DRAWINGS

FIG. 4 illustrates a data structure of a radio status DB 32;

FIG. 7A illustrates a result of a clustering process, FIG. 7B is a table presenting average values of parameters of each cluster, and FIG. 7C is a table presenting a significant difference of each parameter;

DESCRIPTION OF EMBODIMENTS

Even when the method that performs the comparison with the cluster generated from observation data at normal time is employed as in Patent Document 1, anomalies may not be correctly detected because the cluster at normal time may include a quality degradation value.

In addition, there is a method that detects anomalies with a threshold value that is set at normal time, but anomalies may not be correctly detected because a quality degradation value may be included when the threshold value is set. Furthermore, there is a method that detects anomalies by using a learning pattern at normal time, but anomalies may not be correctly detected because there is very little chance that a waveform according to the learning pattern at normal time appears again.

First Embodiment

Hereinafter, a detailed description will be given of a first embodiment of an information-gathering system capable of detecting radio communication anomalies with reference to FIG. 1 through FIG. 8B.

Figure 1:
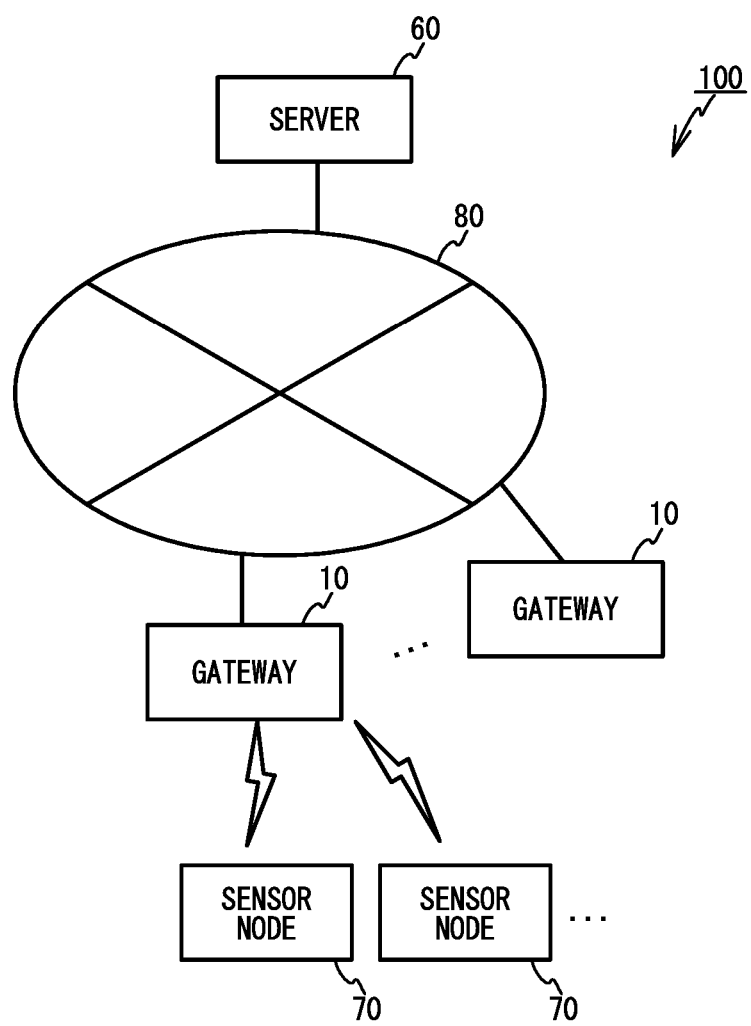
FIG. 1 schematically illustrates a configuration of an information-gathering system in accordance with a first embodiment.

FIG. 1 schematically illustrates a configuration of an information-gathering system 100 in accordance with the first embodiment. The information-gathering system 100 includes many sensor nodes 70, gateways 10 as a device for detecting radio communication anomalies, and a server 60. The gateways 10 and the server 60 are coupled to a network 80.

Figure 3:
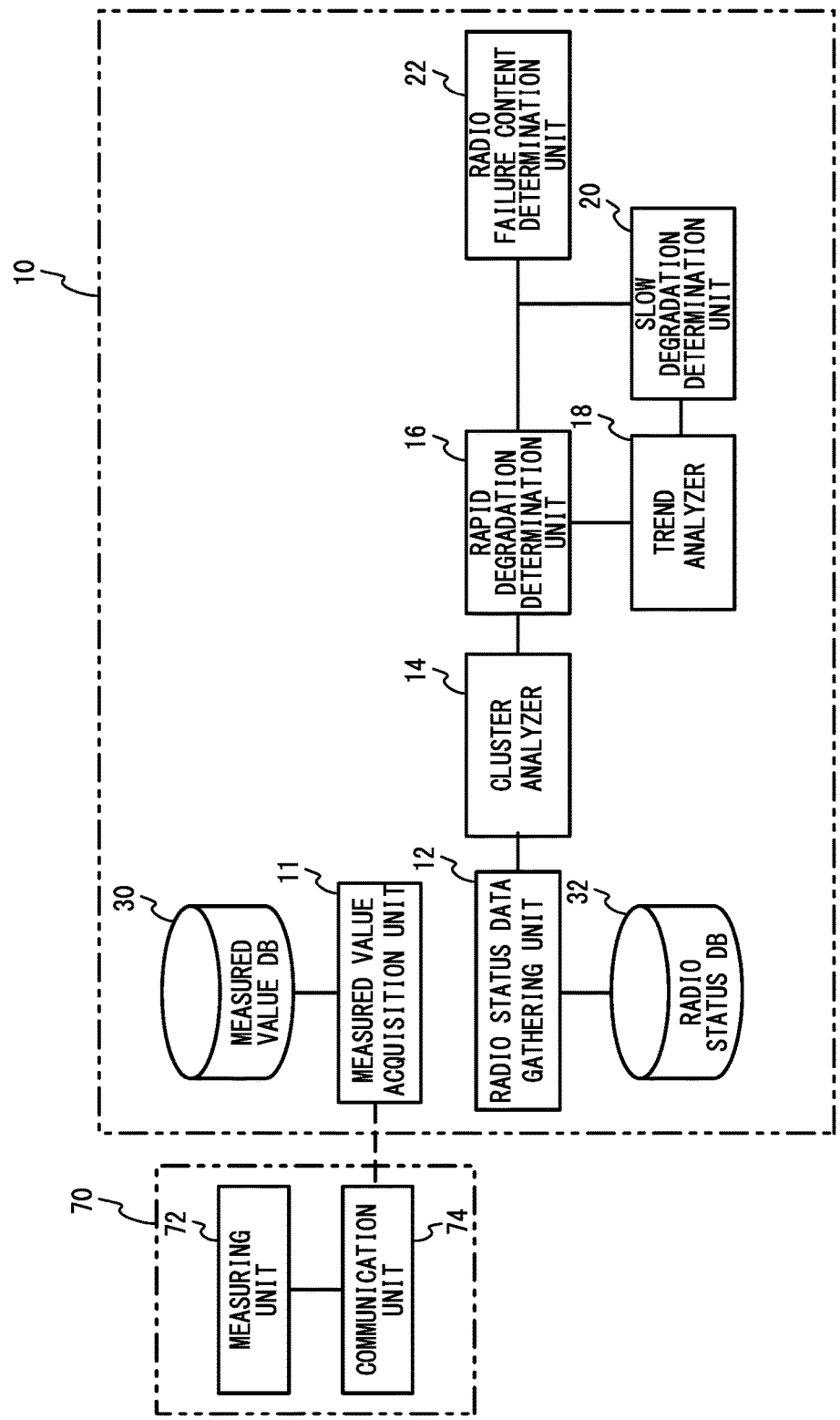
FIG. 3 is a functional block diagram of the gateway.

The sensor node 70 is placed on, for example, the backside of a manhole cover, measures a sewer water level or a gas concentration inside the manhole, and transmits measured values to the gateway 10 by radio communications. The sensor node 70 includes, as illustrated in FIG. 3, a measuring unit 72 that measures a water level or a gas concentration, and a communication unit 74 that transmits a measured value by the measuring unit 72 to the gateway 10 by radio communications.

The gateway 10 is a device installed on, for example, a utility pole, receives measured values from the sensor nodes 70, and transmits the received measured values to the server 60 through the network 80. Additionally, the gateway 10 detects an anomaly of the radio communication between the sensor node 70 and the gateway 10, and transmits the detection result to the server 60.

Figure 2A:
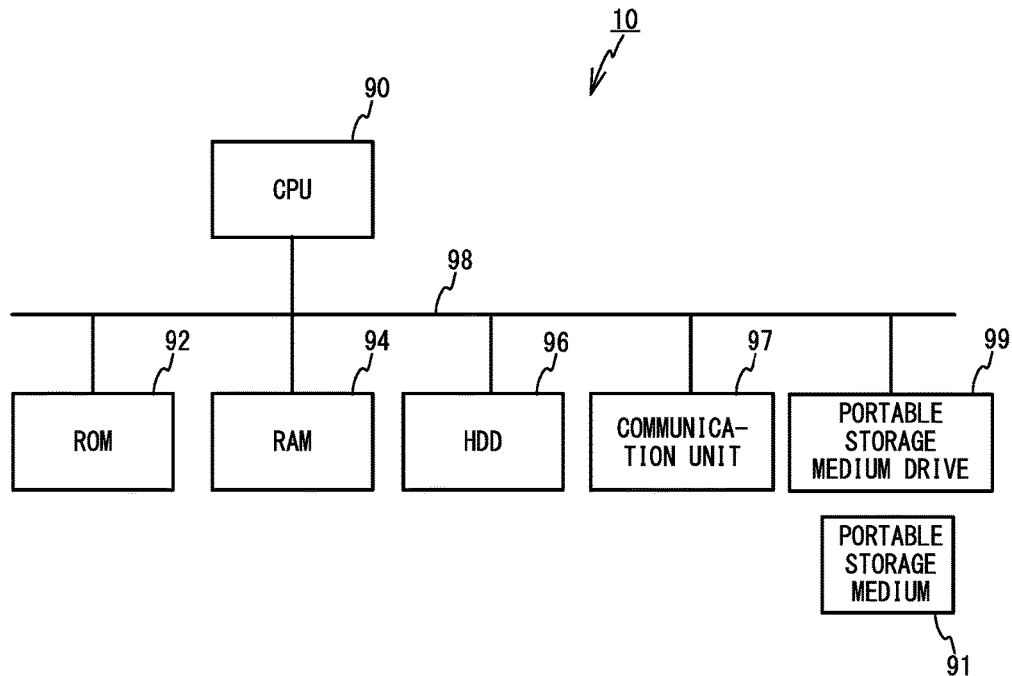
FIG. 2A illustrates a hardware configuration of a gateway.

FIG. 2A illustrates a hardware configuration of the gateway 10. As illustrated in FIG. 2A, the gateway 10 includes a Central Processing Unit (CPU) 90, a Read Only Memory (ROM) 92, a Random Access Memory (RAM) 94, a storage unit (here, a Hard Disk Drive (HDD)) 96, a communication unit 97, and a portable storage medium drive 99. The communication unit 97 has a function of communicating with the communication unit 74 of the sensor node 70 via radio waves, and a function of communicating with the server 60 through the network 80. Each component of the gateway 10 is coupled to a bus 98. In the gateway 10, the function of each unit illustrated in FIG. 3 is implemented by the CPU 90 executing programs (including a program for detecting radio communication anomalies) stored in the ROM 92 or the HDD 96 or programs (including the program for detecting radio communication anomalies) read out from a portable storage medium 91 by the portable storage medium drive 99. The specifics of each unit in FIG. 3 will be described later.

Figure 2B:
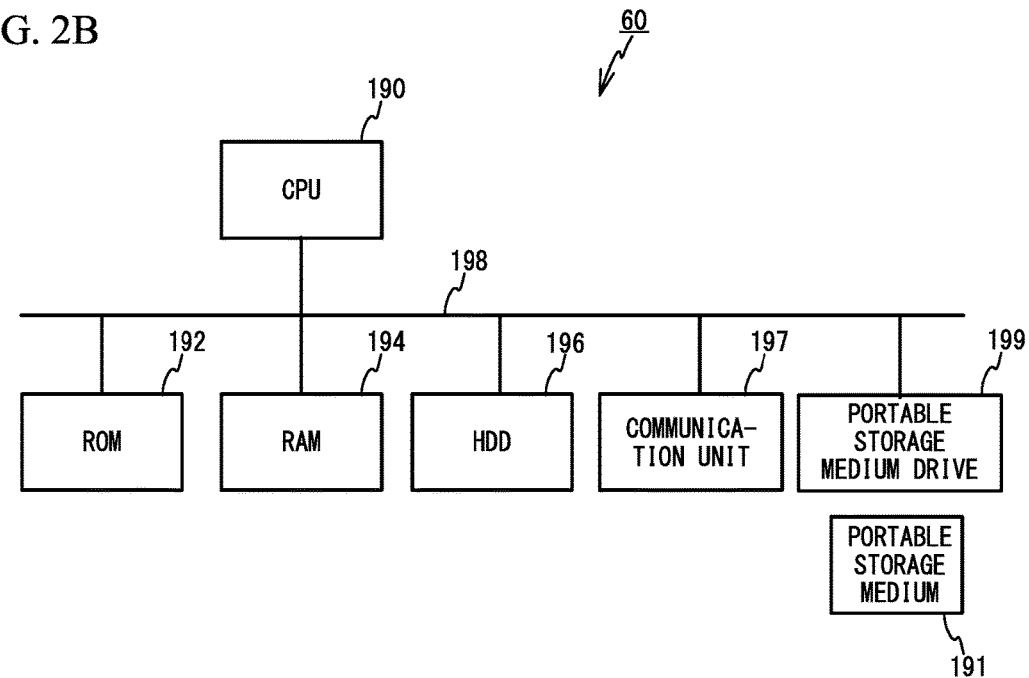
FIG. 2B illustrates a hardware configuration of a server.

The server 60 obtains measured values in the sensor node 70 from the gateway 10, and gathers results of the detection of radio communication anomalies by the gateway 10. Additionally, the server 60 outputs the occurrence of an anomaly to a client (not illustrated) coupled to the network 80 to notify the user (e.g., an administrator) of the client of the occurrence of the anomaly. FIG. 2B illustrates a hardware configuration of the server 60. Similar to the gateway 10, the server 60 includes, as illustrated in FIG. 2B, a CPU 190, a ROM 192, a RAM 194, a storage unit (HDD) 196, a communication unit 197, and a portable storage medium drive 199 capable of reading a portable storage medium 191. Each component of the server 60 is coupled to a bus 198.

Next, the functions of the gateway 10 will be described in detail based on FIG. 3. As illustrated in FIG. 3, the execution of the program by the CPU 90 causes the gateway 10 to function as a measured value acquisition unit 11, a radio status data gathering unit 12 as a gathering unit, a cluster analyzer 14, a rapid degradation determination unit 16, a trend analyzer 18, a slow degradation determination unit 20, and a radio failure content determination unit 22 as an identification unit.

The measured value acquisition unit 11 obtains a measured value (e.g., a water level or a gas concentration) measured by the measuring unit 72 of the sensor node 70, and stores the measured value in a measured value DB 30.

The radio status data gathering unit 12 gathers parameters indicating a radio quality between the communication unit 74 of the sensor node 70 and the measured value acquisition unit 11 at prescribed intervals, and stores the gathered parameters in a radio status DB 32 as a storage unit. Here, the radio status DB 32 has a data structure illustrated in FIG. 4. As illustrated in FIG. 4, the radio status DB 32 has fields of "parameter set order", "radio field intensity (RSSI) [dBm]", "link quality (LQ)", and "response time [ms]". The field of "parameter set order" stores a serial number indicating the order. The field of "radio field intensity (RSSI) [dBm]" stores a value (RSSI: Received Signal Strength Indicator) indicating the intensity of radio waves received by the measured value acquisition unit 11. The radio field intensity is degraded by shielding, and the value of the radio field intensity decreases as the radio field intensity degrades. The field of "link quality (LQ)" stores the value of the Link Quality. The link quality is degraded by shielding or interference, and the value of the link quality decreases as the link quality degrades. The field of "response time [ms]" stores a time for the measured value acquisition unit 11 to obtain a measured value from the time when the measured value acquisition unit 11 has requested a measured value from the sensor node 70. The response time is degraded by shielding and interference, and the value of the response time increases as the response time degrades.

Back to FIG. 3, the cluster analyzer 14 clusters specified parameter sets, which are sets each containing preliminarily specified kinds of parameters, when the predetermined number of the specified parameter sets have been gathered in the radio status data gathering unit 12. The rapid degradation determination unit 16 determines whether the radio communication quality rapidly degrades based on the clustering results.

The trend analyzer 18 performs a trend analysis by using parameters obtained while the rapid degradation determination unit 16 did not determine that the radio communication quality rapidly degraded. The slow degradation determination unit 20 determines whether the radio communication quality slowly degrades based on the result of the analysis by the trend analyzer 18.

The radio failure content determination unit 22 refers to the determination results of the rapid degradation determination unit 16 and the slow degradation determination unit 20 to identify the cause of the radio failure by analyzing the parameters gathered while the radio communication quality degrades.

Process of the Gateway 10

Next, a detailed description will be given of the process of the gateway 10 along the flowchart illustrated in FIG. 5A and FIG. 5B with reference to other drawings. Assume that three parameters (the radio field intensity (RSSI), the link quality (LQ), and the response time) are specified as parameters used for the anomaly determination of the radio quality before the execution of this process. In addition, assume that two parameters (the link quality (LQ) and the response time) are specified as parameters (parameters contained in the specified parameter set) to be clustered by the cluster analyzer 14.

Figure 5A:
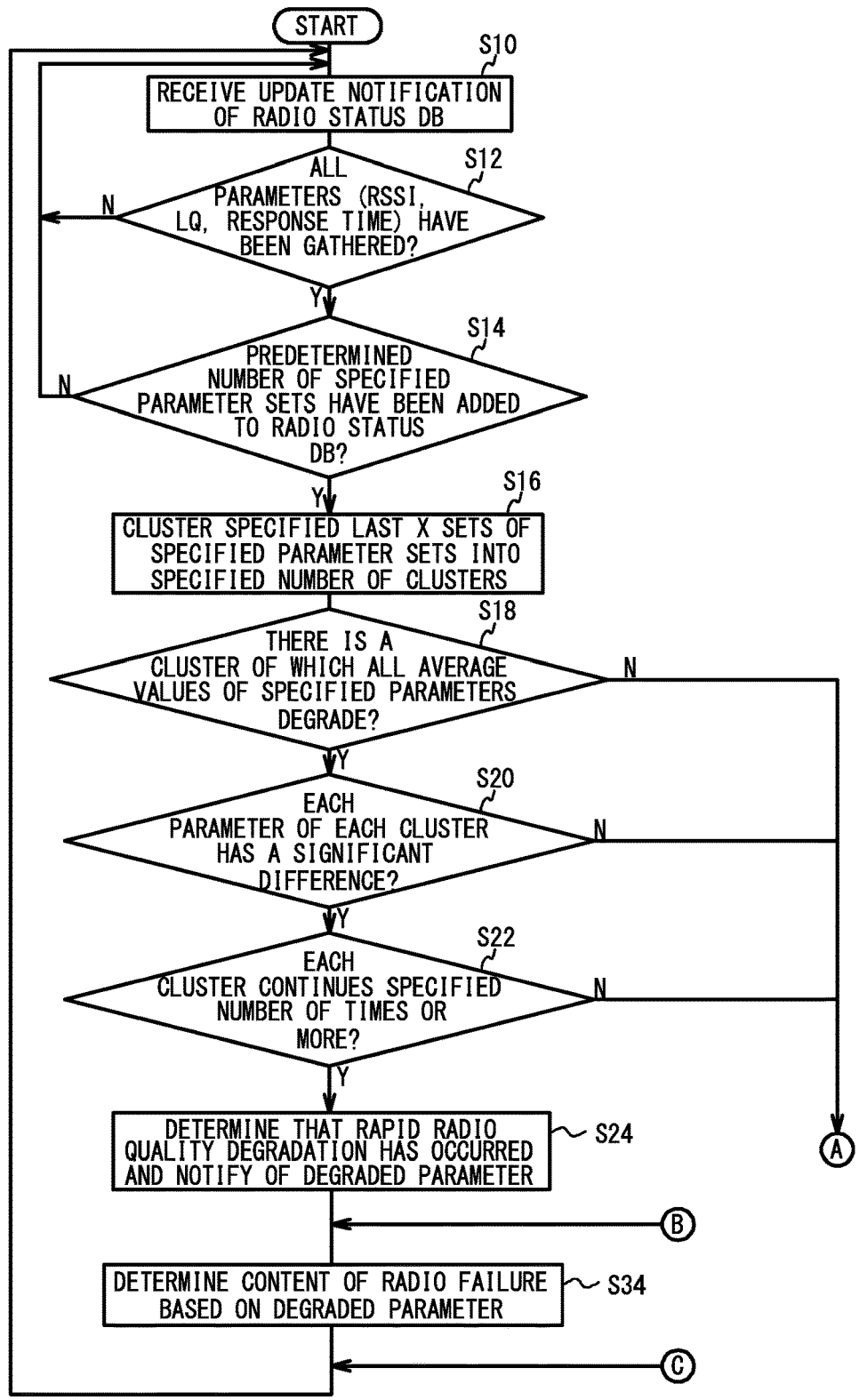
FIG. 5A and FIG. 5B are flowcharts illustrating a process of the gateway in accordance with the first embodiment.
Figure 5B:
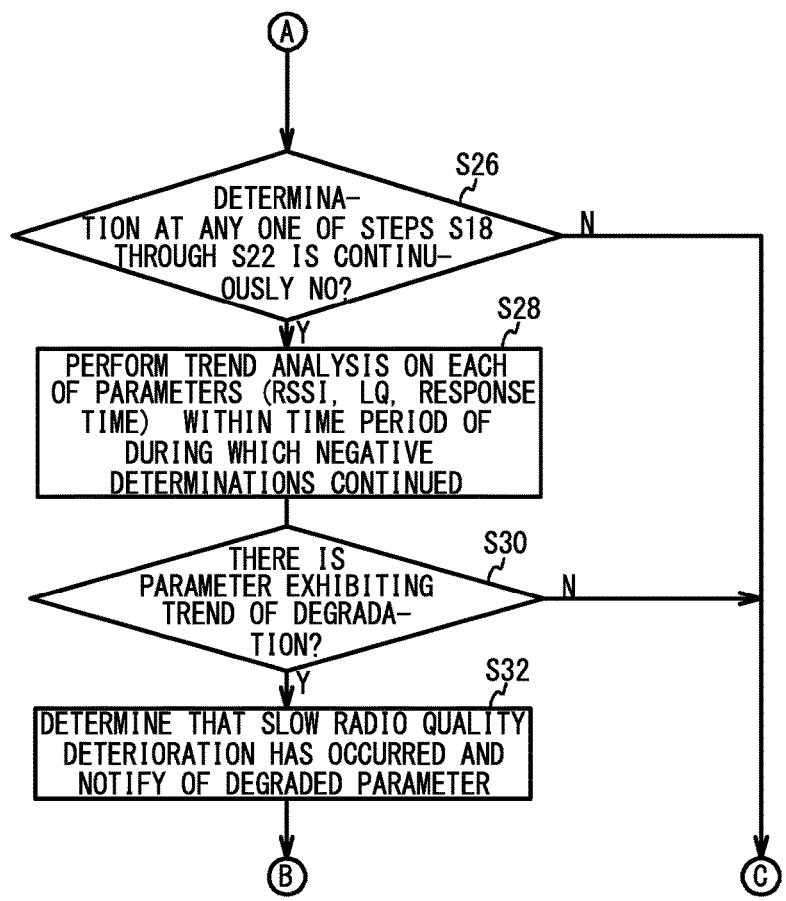

In the process of FIG. 5A and FIG. 5B, at step S10, the cluster analyzer 14 receives an update notification of the radio status DB 32 from the radio status data gathering unit 12. When storing data in the radio status DB 32, the radio status data gathering unit 12 transmits the update notification to the cluster analyzer 14. At step S10, the cluster analyzer 14 may monitor the radio status DB 32 at regular intervals, and check whether the radio status DB 32 has been updated based on the update date and time or the latest data. In this case, the cluster analyzer 14 moves to step S12 when the radio status DB 32 is updated.

Then, at step S12, the cluster analyzer 14 determines whether all the parameters (the RSSI, the LQ, and the response time) have been gathered. When the determination at step S12 is NO, the cluster analyzer 14 returns to step S10. On the other hand, when all the parameters have been gathered, and the determination at step S12 becomes YES, the process moves to step S14.

At step S14, the cluster analyzer 14 determines whether a predetermined number (for example, six) of the specified parameter sets have been added to the radio status DB 32 after the processes from the step S16 have been executed right before step S14. When the determination at step S14 is NO, the cluster analyzer 14 returns to step S10. On the other hand, when the predetermined number of the specified parameter sets have been added, the determination at step S14 becomes YES, and the cluster analyzer 14 moves to step S16.

Figure 6:
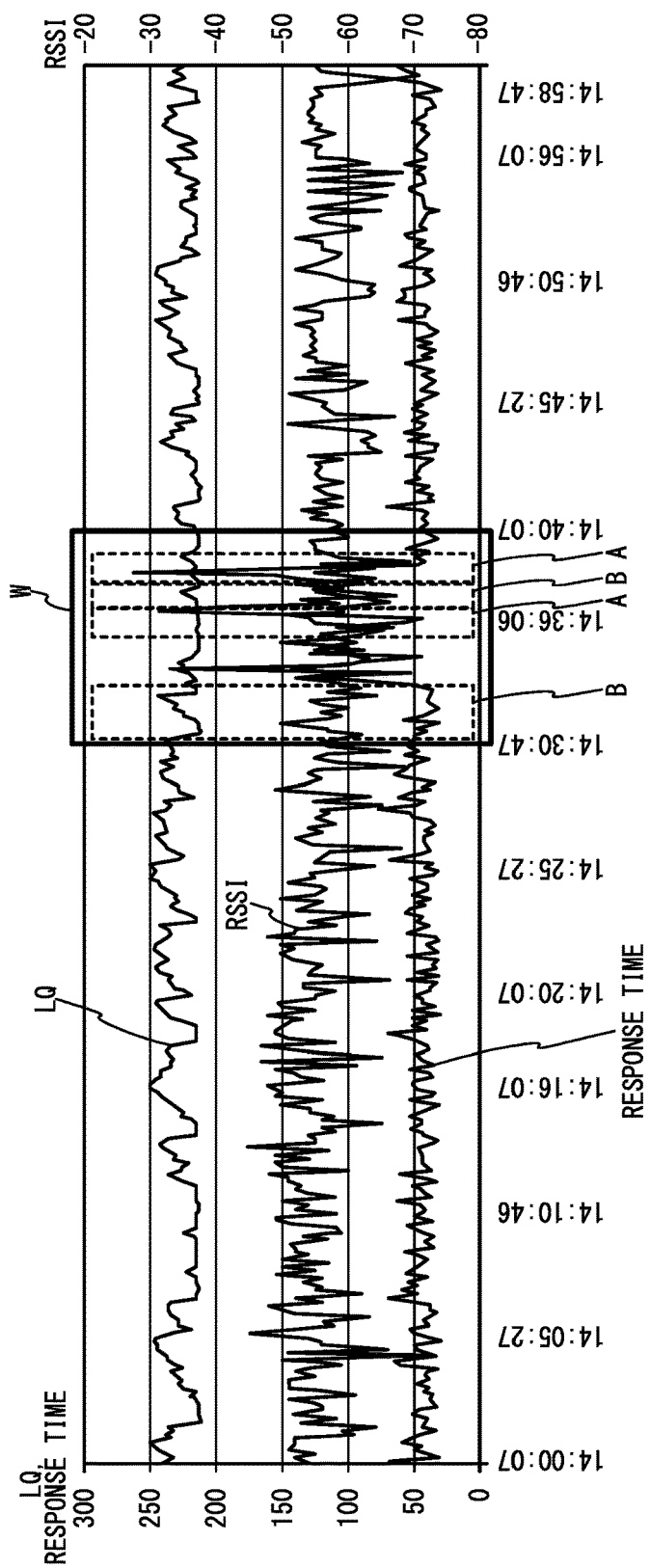
FIG. 6 illustrates parameters gathered in the process of FIG. 5A and FIG. 5B.

At step S16, the cluster analyzer 14 clusters the specified last X sets of the specified parameter sets (the specified parameter sets obtained during the prescribed time period) into a specified number of clusters. The clustering is a method that divides target data into multiple groups based on whether the target data are similar to each other. As a clustering method, an existing method (for example, the K-Means method or the X-Means method) may be employed. Here, FIG. 6 illustrates time-series data of the parameters (the RSSI, the LQ, and the response time). In the present embodiment, assume that the specified parameter sets within a range indicated by a range W in FIG. 6 have been clustered into clusters of which the cluster ID is A or B, and the clusters have been obtained in the order illustrated in FIG. 7A.

Then, at step S18, the rapid degradation determination unit 16 determines whether there is a cluster of which all the average values of the preliminarily specified parameters (the LQ and the response time) degrade. FIG. 7B illustrates the average values of the parameters of the clusters A and B. The average values of the preliminarily specified parameters (the LQ and the response time) of the cluster A degrade more than those of the cluster B. In this case, the determination at step S18 becomes YES, and the process moves to step S20. On the other hand, when the determination at step S18 is NO, the process moves to step S26.

When the determination at step S18 is YES, and the process moves to step S20, the rapid degradation determination unit 16 determines whether each parameter of each cluster has a significant difference. As a method of calculating a significant difference, an existing method (for example, the T-test) may be used. FIG. 7C illustrates the p-value of each parameter calculated by the T-test. When the p-value is less than a predetermined threshold value (e.g., 0.05 (5%)), it can be determined that there is a significant difference. The T-test is disclosed in, for example, Japanese Patent Application Publication No. 2014-038578. The threshold value may be a value other than 0.05.

When the determination at step S20 is NO, the rapid degradation determination unit 16 moves to step S26, while when the determination at step S20 is YES, the rapid degradation determination unit 16 moves to step S22. In the case of FIG. 7C, the radio field intensity (RSSI) has no significant difference, but the link quality (LQ) and the response time have a significant difference.

When the determination at step S20 is YES, and the process thereby moves to step S22, the rapid degradation determination unit 16 determines whether each cluster continues a specified number (e.g., seven) of times or more. In the case of FIG. 7A, the cluster A continues seven times or more from 27th to 34th and from 45th to 51th in the data set sequence, and the cluster B continues seven times or more from 1st to 17th and from 35th to 44th in the data set sequence. When the determination at step S22 is NO, the process moves to step S26, while when the determination at step S22 is YES, the process moves to step S24.

When all the determinations at steps S18, S20, and S22 are YES, and the process moves to step S24, the rapid degradation determination unit 16 determines that rapid radio quality degradation has occurred during the prescribed time period (the range W), and notifies the radio failure content determination unit 22 of the parameter that has degraded. In the example of FIG. 7B and FIG. 7C, the rapid degradation determination unit 16 notifies of the link quality (LQ) and the response time, which numerically degrade and have a significant difference, as the degraded parameters.

After step S24, the process moves to step S34, and the radio failure content determination unit 22 determines the content of the radio failure based on the degraded parameters. For example, when the degraded parameters that have been notified of are all of the radio field intensity (RSSI), the link quality (LQ), and the response time, it is determined that the content of the radio failure is shielding. Alternatively, for example, when the degraded parameters that have been notified of are the link quality (LQ) and the response time, it is determined that the content of the radio failure is interference. In the example of FIG. 7B and FIG. 7C, it is determined that the content of the radio failure is interference. After the process at step S34 is executed, the process returns to step S10.

On the other hand, when the determination at any one of steps S18, S20, and S22 is NO, i.e., when there is no cluster of which all the average values of the preliminarily specified parameters degrade, when all the parameters have no significant difference, or when each cluster does not continue the specified number of times or more, the process moves to step S26. When the process moves to step S26, the trend analyzer 18 determines whether the determination at any one of steps S18 through S22 is continuously NO. When the determination at step S26 is NO, the process returns to step S10. On the other hand, when the determination at step S26 is YES (when the determination at step S26 is repeatedly executed), the process moves to step S28. At step S26, a minimum number of continuous times or a maximum number of continuous times may be preliminarily specified. When the minimum number of continuous times is specified, the determination at step S26 becomes YES when the number of executions of step S26 exceeds the minimum number of continuous times. Alternatively, when the maximum number of continuous times is specified, the number of continuous times is reset when the number of executions of step S26 exceeds the maximum number of continuous times, and the process returns to step S10.

Figure 8A:
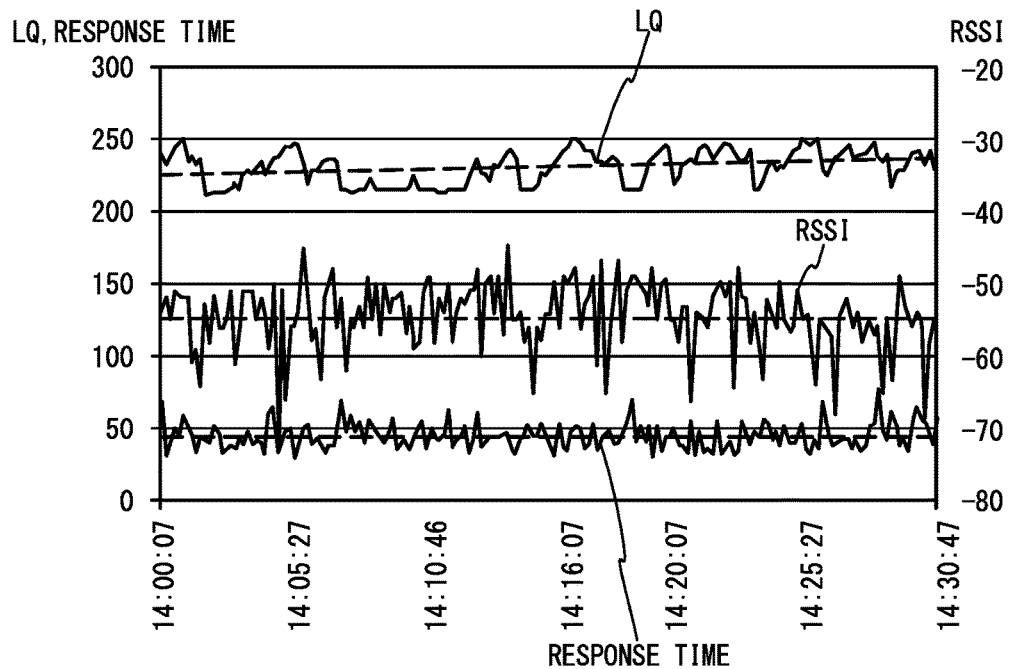
FIG. 8A illustrates an example of a trend analysis performed on parameters gathered during the time period at the left side of a range W in FIG. 6.
Figure 8B:
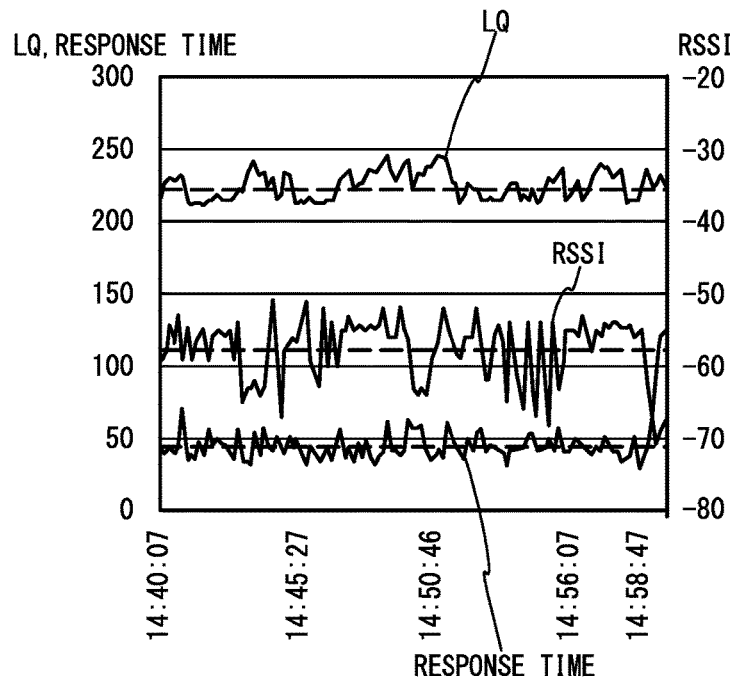
FIG. 8B illustrates an example of a trend analysis performed on parameters gathered during the time period at the right side of the range W in FIG. 6.

When the determination at step S26 becomes YES, and the process moves to step S28, the trend analyzer 18 performs a trend analysis on each of three parameters obtained while the determination at any one of steps S18, S20, and S22 was NO. As a method for the trend analysis, an existing method (for example, the least-square method) may be employed. For example, FIG. 8A illustrates an example of the trend analysis performed on the parameters gathered during the time period at the left side of the range W in FIG. 6. In the example of FIG. 8A, the least-square method is applied to the waveform of each parameter in the trend analysis to obtain approximate linear lines (see dashed lines in FIG. 8A). In FIG. 8A, the slope of the approximate linear line of the link quality (LQ) is positive, indicating that the link quality (LQ) improves. Additionally, the slopes of the approximate linear lines of the radio field intensity (RSSI) and the response time are approximately zero, indicating no change. FIG. 8B illustrates an example of the trend analysis performed on the parameters gathered during the time period at the right side of the range W in FIG. 6. In the example of FIG. 8B, the slopes of the approximate linear lines of the link quality (LQ), the radio field intensity (RSSI), and the response time are approximately zero, indicating no change. In the present process, the threshold value of the slope for determining the improvement or the threshold value of the slope for determining the degradation is preferably preliminarily set.

Then, at step S30, the slow degradation determination unit 20 determines whether there is a parameter exhibiting a trend of degradation. When the determination at step S30 is NO, the process returns to step S10, while the determination at step S30 is YES, the process moves to step S32.

At step S32, the slow degradation determination unit 20 determines that a slow radio quality degradation has occurred, and notifies the radio failure content determination unit 22 of the degraded parameters. Then, at step S34, the radio failure content determination unit 22 determines the content of the radio failure based on the degraded parameters. In this case, as described previously, when the degraded parameters are all of the radio field intensity (RSSI), the link quality (LQ), and the response time, it is determined that the content of the radio failure is shielding. Alternatively, when the degraded parameters are the link quality (LQ) and the response time, it is determined that the content of the radio failure is interference. Then, the process returns to step S10.

The radio failure content determination unit 22 notifies the server 60 of the determination result. When receiving the determination result, the server 60 can inform the user (the administrator or the like) of the client of the occurrence of the radio failure and the cause thereof by notifying the client coupled to the network 80 of the determination result.

In the example of FIG. 6, as a result of the cluster analysis, it is determined that the rapid radio quality degradation has occurred and the cause thereof is interference within the range W. It is also determined that the radio quality degradation has not occurred in other than the range W.

As described in detail above, according to the first embodiment, in the gateway 10, the radio status data gathering unit 12 gathers and stores different kinds of parameters (the RSSI, the LQ, and the response time) indicating the quality of radio communication with the sensor node 70 in the radio status DB 32, and the cluster analyzer 14 classifies the last X sets of the specified parameter sets (the RSSI, the LQ, and the response time) into a plurality of clusters among the stored parameters (S16). Then, when there is a cluster of which all the average values of the specified parameters (the LQ and the response time) degrade more than those of another cluster (S18: YES), the rapid degradation determination unit 16 estimates that the rapid radio quality degradation has occurred (S24). Furthermore, the trend analyzer 18 performs the trend analysis for the time period during which it is not estimated that the rapid radio quality degradation has occurred to determine whether each of the parameters gathered during the time period exhibits a trend of degradation (S28), and the slow degradation determination unit 20 determines whether the slow radio quality degradation has occurred based on the result of the trend analysis (S32). As described above, the radio failure of the rapid change in radio quality and the slow change in radio quality can be precisely detected by determining whether there is the rapid change in radio quality (occurrence of an anomaly) by a clustering method, and determining the slow degradation of the radio quality by the trend analysis when a relative radio quality difference is not seen between clusters. In addition, unlike a method that performs comparison with a learning pattern at normal time and a method that performs comparison with a cluster or a threshold value generated from observation data at normal time, the first embodiment does not use data at normal time, which may have large fluctuation, thereby reducing the erroneous determinations.

Here, the clustering is likely to detect the radio failure when the change from normal to anomaly is rapid, but may erroneously detect the radio failure when the change is slow. Thus, the use of the method described in the first embodiment allows the change in radio quality, which may fail to be determined with a high degree of accuracy by clustering, to be determined with a high degree of accuracy by the trend analysis.

Additionally, in the first embodiment, the rapid degradation determination unit 16 determines that the rapid radio quality degradation has occurred when the determination at step S18 is YES, and it is determined that each parameter of each cluster has a significant difference at step S20. In this case, it is determined that the rapid radio quality degradation has occurred when there is a clear quality difference between clusters, and thus the precise determination is possible.

Additionally, in the first embodiment, the rapid degradation determination unit 16 determines that the rapid radio quality degradation has occurred when the determinations at steps S18 and S20 are YES, and it is determined that each cluster continues a specified number of times or more at step S22. In this case, the determination is performed by excluding data that seems noise data, and thus the determination accuracy of the rapid radio quality degradation can be improved.

Additionally, in the first embodiment, when the rapid degradation determination unit 16 determines that the rapid radio quality degradation has occurred, the radio failure content determination unit 22 identifies the cause of the radio quality degradation based on the kinds of the parameters of which the average values have degraded more than those of another cluster (S34). In addition, when the slow degradation determination unit 20 determines that the slow radio quality degradation has occurred, the radio failure content determination unit 22 identifies the cause of the radio quality degradation based on the kinds of the parameters that exhibit a trend of degradation. This configuration allows for the precise identification of the cause (content) of the radio quality degradation based on the change of each parameter.

The above-described first embodiment describes an exemplary case where the rapid degradation determination unit 16 executes the determinations at steps S18, S20, and S22, but does not intend to suggest any limitation. For example, the rapid degradation determination unit 16 may execute only the determination at step S18, or the determination at step S18 and the determination at step S20 or S22.

In the above-described first embodiment, the parameters that are gathered and parameters used for clustering are mere examples. Other parameters may be gathered, and the clustering may be performed with other parameters.

Second Embodiment

A detailed description will next be given of a second embodiment based on FIG. 9. The configuration of the information-gathering system of the second embodiment is similar to that of the first embodiment except that the gateway 10 executes the process of FIG. 9 in parallel to the process of FIG. 5A and FIG. 5B.

In the process of FIG. 5A and FIG. 5B, the interval at which the radio status data gathering unit 12 gathers the parameters (the RSSI, the LQ, and the response time) is set longer than the interval at which the measured value acquisition unit 11 obtains a measured value. For example, when the interval at which the measured value is gathered is 10 seconds, a predetermined time greater than 10 seconds (e.g., 30 seconds) or a prescribed multiple of 10 seconds (e.g., 10 seconds×3=30 seconds) is set as the interval at which the parameters are gathered.

Figure 9:
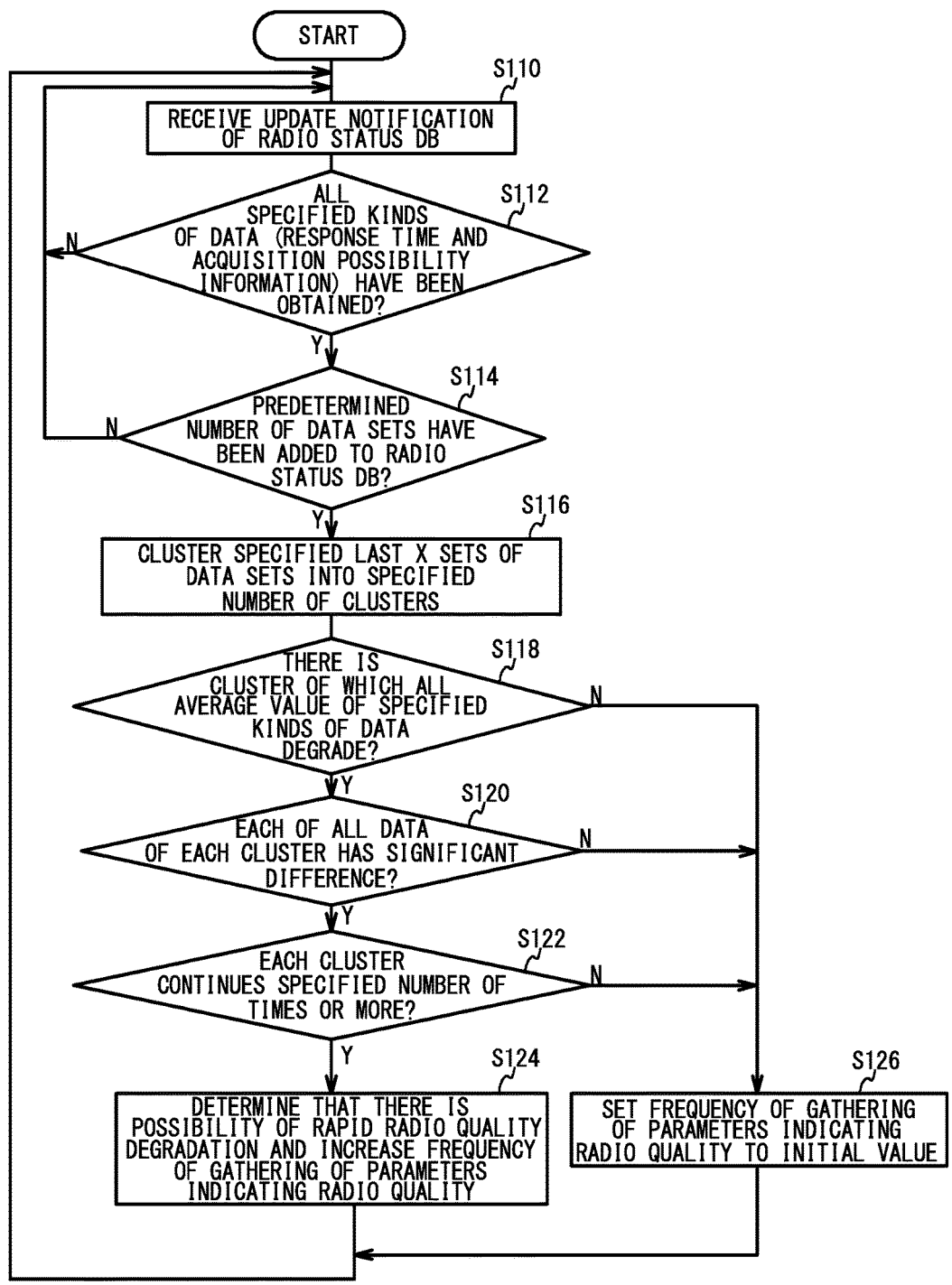
FIG. 9 is a flowchart illustrating a process of the gateway in accordance with a second embodiment.

The process of FIG. 9 is a process for adjusting the interval at which the radio status data gathering unit 12 gathers parameters. Assume that the kind of data gathered in the process of FIG. 9 is preliminarily determined. In the present embodiment, assume that data (the response time and the information indicating whether the measured value can be obtained (acquisition possibility information)) capable of being gathered at the intervals at which the measured value is obtained (e.g., 10-second interval) are defined as data to be gathered. The information indicating whether the measured value can be obtained is information that indicates a case where the measured value acquisition unit 11 could obtain the measured value by "1" and a case where the measured value could not be obtained by "0".

In the process of FIG. 9, at step S110, the cluster analyzer 14 receives the update notification of the radio status DB 32 from the radio status data gathering unit 12. When storing data in the radio status DB 32, the radio status data gathering unit 12 transmits the update notification to the cluster analyzer 14. In the second embodiment, the radio status data gathering unit 12 transmits the update notification to the cluster analyzer 14 at intervals of 10 seconds. At step S110, the cluster analyzer 14 may monitor the radio status DB 32 at regular intervals, and check whether the radio status DB 32 is updated based on the update date and time or the latest data.

Then, at step S112, the cluster analyzer 14 determines whether all specified kinds of data (the response time and the acquisition possibility information) have been obtained. When the determination at step S112 is NO, the cluster analyzer 14 returns to step S110. On the other hand, when all the specified kinds of data have been obtained and the determination at step S112 becomes YES, the process moves to step S114.

At step S114, the cluster analyzer 14 determines whether a predetermined number (e.g., six) of data sets, which are sets each containing the specified kinds of data, have been added to the radio status DB 32 after the processes from step S116 have been executed right before step S114. When the determination at step S114 is NO, the cluster analyzer 14 returns to step S110. On the other hand, when the predetermined number of data sets have been added, the determination at step S114 becomes YES, and the cluster analyzer 14 moves to step S116.

At step S116, the cluster analyzer 14 clusters the specified last X sets of the data sets into a specified number of clusters. As a clustering method, similar to step S16 of FIG. 5A, an existing method (for example, the K-Means method or the X-Means method) may be employed.

Then, at step S118, the rapid degradation determination unit 16 determines whether there is a cluster of which all the average values of the specified kinds of data (the response time and the acquisition possibility information) degrade. When the determination at step S118 is YES, the process moves to step S120. On the other hand, when the determination at step S118 is NO, the process moves to step S126.

When the determination at step S118 becomes YES, and the process moves to step S120, the rapid degradation determination unit 16 determines whether each of all the data of each cluster has a significant difference. As a method for calculating a significant difference, similar to step S18 of FIG. 5A, an existing method (for example, the T-test) may be used. When the determination at step S120 is NO, the rapid degradation determination unit 16 moves to step S126, while when the determination is YES, the process moves to step S122.

When the determination at step S120 is YES, and the process moves to step S122, the rapid degradation determination unit 16 determines whether each cluster continues a specified number (e.g., seven) of times or more. When the determination at step S122 is NO, the process moves to step S126, while the determination is YES, the process moves to step S124.

When all the determinations at steps S118, S120, and S122 are YES, and the process moves to step S124, the rapid degradation determination unit 16 determines that there is a possibility of the rapid radio quality degradation. Then, the rapid degradation determination unit 16 instructs the radio status data gathering unit 12 to increase the frequency of gathering of the parameters (the RSSI, the LQ, and the response time) indicating the radio quality. When receiving the instruction, the radio status data gathering unit 12 changes the interval at which the parameters indicating the radio quality are gathered from, for example, 30 seconds to 10 seconds. The interval at which the parameters are gathered may not necessarily correspond to the interval at which the measured value is obtained (10-second interval), and may be an interval (e.g., 8-second interval) less than the interval at which the measured value is obtained.

On the other hand, when the determination at any one of steps S118, S120, and S122 is NO, and the process moves to step S126, the rapid degradation determination unit 16 sets the frequency of gathering of the parameters indicating the radio quality to an initial value (or keeps the frequency at an initial value).

After step S124 or S126, the process returns to step S110, and the above-described processes are repeated.

The execution of the above-described processes allows the process of FIG. 5A and FIG. 5B to be executed with use of the parameters gathered at long intervals (intervals of 30 seconds) till it is determined that there is a possibility of the rapid radio quality degradation. Additionally, when it is determined that there is a possibility of the rapid radio quality degradation, the interval at which the parameters are gathered is shortened, and the process of FIG. 5A and FIG. 5B is executed at the shortened intervals. As described above, the dynamic change of the interval at which the parameters are gathered allows the radio communication load to be reduced and the accuracy of the anomaly determination of the radio communication to be increased.

As described in detail above, in the second embodiment, the radio status data gathering unit 12 gathers and stores a data set, which includes the information on whether the measured value can be obtained from the sensor node 70 and the response time of the sensor node 70 at the time of obtaining the measured value, in the radio status DB 32. Additionally, the cluster analyzer 14 classifies the last X sets of the data sets into a plurality of clusters among stored data sets (S116). Then, when there is a cluster of which the average of the acquisition possibility information and the average of the response time degrade more than those of another cluster (S118: YES), the rapid degradation determination unit 16 increases the frequency of gathering of the parameters (the RSSI, the LQ, and the response time) (S124). This configuration allows the interval at which the parameters are gathered to be adjusted to a proper interval, reducing the radio communication load and increasing the accuracy of the anomaly determination of the radio communication.

Additionally, in the second embodiment, the rapid degradation determination unit 16 determines that there is a possibility of the rapid radio quality degradation when the determination at step S118 is YES, and it is determined that each parameter of each cluster has a significant difference at step S120. In this case, since it is determined that there is a possibility of the rapid radio quality degradation when there is a clear quality difference between clusters, the precise determination is possible.

In the second embodiment, the rapid degradation determination unit 16 determines that there is a possibility of the rapid radio quality degradation when the determinations at steps S118 and S120 are YES, and it is determined that each cluster continues a specified number of times or more at step S122. In this case, since the determination is executed by excluding data that seems noise data, the accuracy in determining a possibility of the rapid radio quality degradation can be increased.

The processes of the above-described second embodiment are applicable not only to a system that obtains the measured value of the sensor node 70 at regular intervals but also to a system of which the notification frequency of the measured value from the sensor node 70 is irregular but high.

The above-described second embodiment describes an exemplary case where the rapid degradation determination unit 16 executes the determinations at steps S118, S120, and S122, but does not intend to suggest any limitation. For example, the rapid degradation determination unit 16 may execute only the determination at step S118, or the determination at step S118 and the determination at step S120 or step S122.

In the above-described second embodiment, data included in the data set that is gathered is a mere example. That is, in the process of FIG. 9, other data may be gathered and used for clustering.

Third Embodiment

A description will next be given of a third embodiment. In the third embodiment, the gateway 10 executes the process of FIG. 5A and FIG. 5B as in the first embodiment, but dynamically adjusts a processing amount depending on the load information of the gateway 10.

In the third embodiment, in the process of FIG. 5A and FIG. 5B, when the determination at step S26 is YES, the process moves to step S28. At step S28, the trend analyzer 18 performs the trend analysis on each of the parameters (the RSSI, the LQ, and the response time) gathered while the determination at any one of steps S18 through S22 was NO. At step S28, the trend analyzer 18 also obtains the utilization of the CPU 90 and the utilization of the memory (the RAM 94) during the trend analysis. When the obtained utilization is greater than a preliminarily specified threshold value, the trend analyzer 18 sets the maximum number of continuous times to the number of continuous times at that time (the number of times for which step S26 is repeated at present time). In addition, the trend analyzer 18 resets the maximum number of continuous times or sets the maximum number of continuous times to the maximum number of continuous times at that time+a when the obtained utilization is less than the preliminarily specified threshold value.

The cost for the analysis can be reduced and the accuracy of the anomaly determination of the radio communication can be increased by dynamically changing the data amount for the trend analysis depending on the load information of the gateway 10.

The above-described third embodiment describes an exemplary case where the trend analyzer 18 obtains the utilization of the CPU 90 and the utilization of the memory (RAM 94) as the load on the gateway 10, but does not intend to suggest any limitation. Other data (for example, the temperature of the CPU (the amount of heat generation)) may be obtained as the load on the gateway 10.

The above-described first through third embodiments describe an exemplary case where the process for determining whether the radio failure occurs and the process for determining the content are executed in the gateway 10, but do not intend to suggest any limitation. For example, the server 60 may execute the process of the gateway 10 described in the first through third embodiments. In addition, the execution of the process of the gateway 10 described in the first through third embodiments may be shared by the gateway 10 and the server 60.

The first through third embodiments describe an exemplary case where the sensor node 70 is a sensor that is located on a manhole cover and detects a water level or a gas concentration, but do not intend to suggest any limitation. That is, the type and the installation location of the sensor node 70 can be appropriately changed. For example, the sensor node 70 may be a sensor that is installed in an individual residence and detects electrical power consumption.

The above-described processing functions are implemented by a computer. In this case, a program in which processing details of the functions that a processing device (CPU) is to have are written are provided. The execution of the program by the computer allows the computer to implement the above described processing functions. The program in which the processing details are written can be stored in a storage medium (however, excluding carrier waves) capable of being read by a computer.

When the program is distributed, it may be sold in the form of a portable storage medium such as a DVD (Digital Versatile Disc) or a CD-ROM (Compact Disc Read Only Memory) storing the program. The program may be stored in a storage device of a server computer, and the program may be transferred from the server computer to another computer over a network.

A computer executing the program stores the program stored in a portable storage medium or transferred from a server computer in its own storage device. The computer then reads the program from its own storage device, and executes a process according to the program. The computer may directly read the program from a portable storage medium, and execute a process according to the program. Alternatively, the computer may successively execute a process, every time the program is transferred from a server computer, according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A device for detecting radio communication anomalies, the device being capable of communicating with a sensor node via radio waves, the device comprising:
a memory; and
a processor coupled to the memory and configured to:
gather and store different parameters in a storage unit, the different parameters indicating a quality of radio communication with the sensor node;
classify parameter sets into a plurality of clusters, each of the parameter sets containing specific parameters gathered during a prescribed time period among the parameters stored in the storage unit;
estimate that a rapid radio quality degradation has occurred during the prescribed time period when there is a cluster of which all average values of specified parameters among the different parameters degrade more than those of another cluster;
perform a trend analysis of each of the different parameters for a time period during which it is not estimated that the rapid radio quality degradation has occurred to determine whether each of the different parameters gathered during the time period exhibits a trend of degradation, the trend analysis analyzing a trend of change in each of the different parameters for the time period; and
estimate that a slow radio quality degradation has occurred when there is a parameter exhibiting a trend of degradation among the different parameters.

2. The radio communication anomaly detection device of claim 1, wherein the processor is configured to estimate that the rapid radio quality degradation has occurred during the prescribed time period when there is a cluster of which all the average values of the specified parameters among the different parameters degrade more than those of another cluster and each of the different parameters has a predetermined significant difference in the plurality of clusters, and/or when each of the plurality of clusters continues a predetermined number of times or more.

3. The radio communication anomaly detection device of claim 1, wherein the processor is configured to identify a cause of a radio quality degradation based on a kind of a parameter of which an average value degrades more than that of another cluster when estimating that the rapid radio quality degradation has occurred, and identify a cause of a radio quality degradation based on a kind of a parameter that exhibits a trend of degradation when estimating that the slow radio quality degradation has occurred.

4. The radio communication anomaly detection device of claim 1, wherein the processor is configured to:
gather and store data sets in the storage unit, each of the data sets containing information on whether a measured value can be obtained from the sensor node and a response time of the sensor node at a time of obtaining the measured value,
classify data sets gathered during the prescribed time period among the data sets stored in the storage unit into the plurality of clusters, and
increase a frequency of gathering of the different parameters when there is a cluster of which an average of the information on whether a measured value can be obtained from the sensor node and an average of the response time degrade more than those of another cluster.

5. The radio communication anomaly detection device of claim 4, wherein the processor is configured to increase the frequency of gathering of the different parameters when there is a cluster of which the average of the information on whether a measured value can be obtained from the sensor node and the average of the response time degrade more than those of another cluster and each of the information on whether a measured value can be obtained from the sensor node and the response time has a predetermined significant difference in the plurality of clusters, and/or when each of the plurality of clusters continues a predetermined number of times or more.

6. The radio communication anomaly detection device of claim 1, wherein the processor is configured to obtain a load information while the trend analysis is performed, and adjust a number of parameter sets that is to be subject to the trend analysis based on the load information.

7. A method for detecting radio communication anomalies implemented by a computer capable of communicating with a sensor node via radio waves, the method comprising:
gathering and storing different parameters in a storage unit, the different parameters indicating a quality of radio communication with the sensor node;
classifying parameter sets into a plurality of clusters, each of the parameter sets containing specific parameters gathered during a prescribed time period among the parameters stored in the storage unit;
estimating that a rapid radio quality degradation has occurred during the prescribed time period when there is a cluster of which all average values of specified parameters among the different parameters degrade more than those of another cluster; and
performing a trend analysis of each of the different parameters for a time period during which it is not estimated that the rapid radio quality degradation has occurred to determine whether each of the different parameters gathered during the time period exhibits a trend of degradation, the trend analysis analyzing a trend of change in each of the different parameters for the time period, and estimating that a slow radio quality degradation has occurred when there is a parameter exhibiting a trend of degradation among the different parameters.

8. The method of claim 7, wherein
the estimating that the rapid radio quality degradation has occurred includes estimating that the rapid radio quality degradation has occurred during the prescribed time period when there is a cluster of which all the average values of the specified parameters among the different parameters degrade more than those of another cluster and each of the different parameters has a predetermined significant difference in the plurality of clusters, and/or when each of the plurality of clusters continues a predetermined number of times or more.

9. The method of claim 7, further comprising:
identifying a cause of a radio quality degradation based on a kind of a parameter of which an average value degrades more than that of another cluster when it is estimated that the rapid radio quality degradation has occurred; and
identifying a cause of a radio quality degradation based on a kind of a parameter that exhibits a trend of degradation when it is estimated that the slow radio quality degradation has occurred.

10. The method of claim 7, further comprising:
gathering and storing data sets in the storage unit, each of the data sets containing information on whether a measured value can be obtained from the sensor node and a response time of the sensor node at a time of obtaining the measured value;

classifying data sets gathered during the prescribed time period among the data sets stored in the storage unit into the plurality of clusters; and increasing a frequency of gathering of the different parameters when there is a cluster of which an average of the information on whether a measured value can be obtained from the sensor node and an average of the response time degrade more than those of another cluster.

11. The method of claim 10, wherein the increasing of the frequency of gathering includes increasing the frequency of gathering of the different parameters when there is a cluster of which the average of the information on whether a measured value can be obtained from the sensor node and the average of the response time degrade more than those of another cluster and each of the information on whether a measured value can be obtained from the sensor node and the response time has a predetermined significant difference in the plurality of clusters, and/or when each of the plurality of clusters continues a predetermined number of times or more.

12. The method of claim 7, further comprising:

obtaining a load information of the computer while the computer performs the trend analysis; and adjusting a number of parameter sets that is to be subject to the trend analysis based on the load information.

13. A non-transitory computer readable medium storing a program for detecting radio communication anomalies, the program causing a computer capable of communicating with a sensor node via radio waves to execute a process, the process comprising:

gathering and storing different parameters in a storage unit, the different parameters indicating a quality of radio communication with the sensor node;

classifying parameter sets into a plurality of clusters, each of the parameter sets containing specific parameters gathered during a prescribed time period among the parameters stored in the storage unit;

estimating that a rapid radio quality degradation has occurred during the prescribed time period when there is a cluster of which all average values of specified parameters among the different parameters degrade more than those of another cluster; and performing a trend analysis of each of the different parameters for a time period during which it is not estimated that the rapid radio quality degradation has occurred to determine whether each of the different parameters gathered during the time period exhibits a trend of degradation, the trend analysis analyzing a trend of change in each of the different parameters for the time period, and estimating that a slow radio quality degradation has occurred when there is a parameter exhibiting a trend of degradation among the different parameters.

14. The non-transitory computer readable medium of claim 13, wherein the estimating that the rapid radio quality degradation has occurred includes estimating that the rapid radio quality degradation has occurred during the prescribed time period when there is a cluster of which all the average values of the specified parameters among the different parameters degrade more than those of another cluster and each of the different parameters has a predetermined significant difference in the plurality of clusters, and/or when each of the plurality of clusters continues a predetermined number or more.

15. The non-transitory computer readable medium of claim 13, wherein the process further comprises:

identifying a cause of a radio quality degradation based on a kind of a parameter of which an average value degrades more than that of another cluster when it is estimated that the rapid radio quality degradation has occurred; and identifying a cause of a radio quality degradation based on a kind of a parameter that exhibits a trend of degradation when it is estimated that the slow radio quality degradation has occurred.

16. The non-transitory computer readable medium of claim 13, wherein the process further comprises:

gathering and storing data sets in the storage unit, each of the data sets containing information on whether a measured value can be obtained from the sensor node and a response time of the sensor node at a time of obtaining the measured value;

classifying data sets gathered during the prescribed time period among the data sets stored in the storage unit into the plurality of clusters; and increasing a frequency of gathering of the different parameters when there is a cluster of which an average of the information on whether a measured value can be obtained from the sensor node and an average of the response time degrade more than those of another cluster.

17. The non-transitory computer readable medium of claim 16, wherein the increasing of the frequency of gathering includes increasing the frequency of gathering of the different parameters when there is a cluster of which the average of the information on whether a measured value can be obtained from the sensor node and the average of the response time degrade more than those of another cluster and each of the information on whether a measured value can be obtained from the sensor node and the response time has a predetermined significant difference in the plurality of clusters, and/or when each of the plurality of clusters continues a predetermined number of times or more.

18. The non-transitory computer readable medium of claim 13, wherein the process further comprises:

obtaining a load information of the computer while the computer performs the trend analysis; and adjusting a number of parameter sets that is to be subject to the trend analysis based on the load information.

* * * * *